S. A. KNOX.
Cultivator.
No. 12,536.
Patented Mar. 13, 1855.
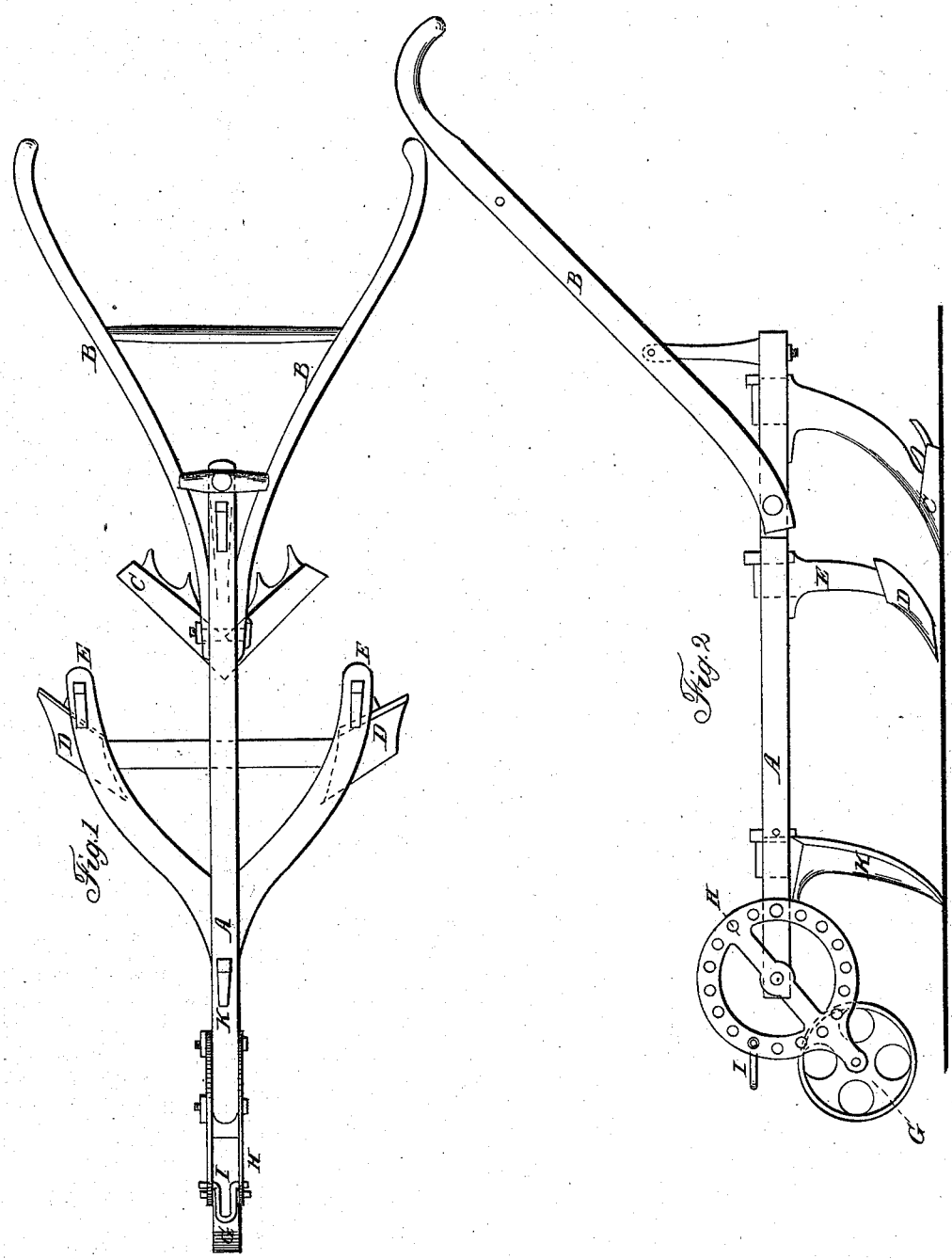

UNITED STATES PATENT OFFICE.

SAMUEL A. KNOX, OF WORCESTER, MASSACHUSETTS, ASSIGNOR TO RUGGLES, NOURSE, MASON & CO.

IMPROVEMENT IN CULTIVATORS.

Specification forming part of Letters Patent No. 12,536, dated March 13, 1855.

*To all whom it may concern:*

Be it known that I, SAMUEL A. KNOX, of Worcester, and State of Massachusetts, have invented a new and useful Improvement in Horse-Hoes; and I do hereby declare that the same is fully described and represented in the following specification and the accompanying drawings, letters, figures, and references thereof.

Of the said drawings, Figure 1 denotes a top view, and Fig. 2 a side elevation, of a horse-hoe constructed in accordance with the principles of my invention.

A in such drawings exhibits the beam of the hoe; B B, the handles of said beam; C, the rear double hoe or blade; and D D, two lateral hoes or blades, which are affixed to arms E E, extending from the main beam, as seen in the drawings. In front of the extreme forward end of the main beam there is a regulating guide-wheel, G, which is affixed to the said beam by means of an adjustable frame, H, that carries the draft-shackle I, and is made and applied to the beam and the guide-wheel in a manner well known and in common use. Just in rear of the front end of the beam I combine with the beam a curved and pointed knife or tooth, K, while at or near the opposite end of the beam I apply the main double hoe C, the tooth K being curved downward and toward the front of the main beam, as seen in the drawings. The particular object of this tooth K, when the hoe is in use, is to enable an attendant, while having hold of the handles to steady the horse-hoe and to prevent the lateral irregular motion of it, which often takes place and is produced by the draft and obstructions that tend to throw the implement out of its true course. The curved tooth, by penetrating the earth, elevates the front end of the beam under the irregularities of the draft. Another object of the tooth is to enable the attendant to make use of it as a fulcrum or wheel to move the hoe, so as to enable him to suddenly lift the rear part of it and move it so as to throw or flirt loose earth among stalks of the hills between which he may be using the hoe or implement.

The manner in which the tooth is curved operates to prevent the power of the draft from raising the front end of the beam too high above the ground.

I do not claim combining a curved and pointed knife with a common land-plow when said knife is placed against or very near to the nose of the plow, my employment of the knife or tooth on the horse-hoe being in a different manner and for a different purpose from its use on a plow; but What I do claim is—

Arranging the curved knife or pointed tooth K at or near the front end of the beam of the horse-hoe, while the main or double hoe C is disposed at or near the rear end of the beam and so as to enable the said tooth to be used in manner and for the purposes as stated, it being employed in a common plow simply for cutting the sod or opening it for the reception of the nose of the plow.

In testimony whereof I have hereunto set my signature this 11th day of January, A. D. 1855.

SAMUEL A. KNOX.

Witnesses:
SAMUEL BANISTER,
WM. GREENLEAF.